(12) United States Patent
Yoshimura et al.

(10) Patent No.: US 6,802,298 B2
(45) Date of Patent: Oct. 12, 2004

(54) PRESSURE CONTROL VALVE FOR CONTROLLING OPERATION OF FUEL INJECTOR

(75) Inventors: Tetsuya Yoshimura, Toyota (JP); Shuichi Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/734,157

(22) Filed: Dec. 15, 2003

(65) Prior Publication Data

US 2004/0124277 A1 Jul. 1, 2004

(30) Foreign Application Priority Data

Dec. 26, 2002 (JP) .......................................... 2002-377259

(51) Int. Cl.⁷ .............................................. F02M 47/02
(52) U.S. Cl. .................. 123/467; 251/282; 137/625.69; 239/88; 239/533.2
(58) Field of Search ......................... 123/467; 251/282, 251/30.01, 129.06; 137/625.69; 239/88–90, 533.2, 533.3

(56) References Cited

U.S. PATENT DOCUMENTS

| | | | |
|---|---|---|---|
| 4,155,535 A | * 5/1979 | Seamone | 251/282 |
| 5,551,398 A | 9/1996 | Gibson et al. | 123/446 |
| 6,371,438 B1 | * 4/2002 | Boecking | 251/57 |
| 6,626,372 B2 | * 9/2003 | Boecking | 239/96 |
| 6,736,331 B2 | * 5/2004 | Boecking | 239/88 |
| 2002/0020394 A1 | * 2/2002 | Boecking | 123/467 |
| 2003/0019960 A1 | * 1/2003 | Magel | 239/585.5 |
| 2003/0047619 A1 | * 3/2003 | Boecking | 239/88 |
| 2003/0052187 A1 | * 3/2003 | Boecking | 239/124 |
| 2004/0011887 A1 | * 1/2004 | Boecking | 239/533.2 |

FOREIGN PATENT DOCUMENTS

EP 0995900 A1 * 4/2000

* cited by examiner

Primary Examiner—Weilun Lo
(74) Attorney, Agent, or Firm—Nixon & Vanderhye P.C.

(57) ABSTRACT

A nozzle needle of a fuel injector is driven in a controlled manner by changing back pressure applied thereto. The back pressure is controlled by a pressure control valve driven by stacked piezoelectric elements. A valve body of the pressure control valve is disposed in a valve chamber having a drain port and a high pressure port which are selectively closed. A diameter D1 of a drain seat, a diameter D2 of a high pressure seat, and a diameter D3 of a piston portion connected to the valve body are set to satisfy a relation: $D1 \geq D2 \geq D3$. In this manner, operation of the pressure control valve is stabilized, and thereby the fuel injector is smoothly and stably operated.

12 Claims, 9 Drawing Sheets

$A1: \phi Da \times La \times \pi$
$A2: \phi Db \times La \times \pi$ $A1: \phi Da \times La \times \pi$
$A2: \phi Db \times Lb \times \pi$

PRESSURE CONTROL VALVE FOR CONTROLLING OPERATION OF FUEL INJECTOR

CROSS-REFERENCE TO RELATED APPLICATION

This application is based upon and claims benefit of priority of Japanese Patent Application No. 2002-377259 filed on Dec. 26, 2002, the content of which is incorporated herein by reference.

BACKGROUND OF THE INVENTION

1. Field of the Invention

The present invention relates to a pressure control valve used in a fuel injector for supplying fuel to an internal combustion engine.

2. Description of Related Art

In a common rail type fuel injection system, pressurized fuel contained in a common rail is supplied to an internal combustion engine through a fuel injector installed in each engine cylinder. The pressurized fuel introduced into the injector is injected into the engine by driving a nozzle needle in a controlled manner. A control chamber into which the pressurized fuel is introduced is provided behind the nozzle needle. The nozzle needle of the injector is controlled by changing fuel pressure in the control chamber. The pressure in the control chamber is in turn controlled by a pressure control valve. More particularly, when the fuel pressure in the control chamber decreases, the nozzle needle is lifted from its seat and the fuel is injected into the engine. When the pressure in the control chamber increases, the nozzle needle sits on its seat, and thereby fuel injection is terminated. The pressure control valve is driven by an actuator such as a piezoelectric actuator.

An example of this kind of injector is disclosed in JP-A-2001-82295. The injector disclosed therein includes a two-way valve that has a control piston for selectively opening an inlet port or an outlet port, both ports communicating with a control chamber. A guiding member for compensating a force applied to the piston is provided at one end of the piston, and a centering member for correctly positioning the piston relative to a valve seat is provided at the other end. When the control piston is lifted from the valve seat, the control chamber communicates with a drain passage, and fuel flows out from the control chamber. When the communication between the control chamber and the drain passage is interrupted, the fuel pressure in the control chamber is increased by pressurized fuel introduced into the control chamber.

Another example of this kind of injector is disclosed in JP-A-2000-130614. The injector disclosed therein has a three-way valve for controlling pressure in a control chamber. The three-way valve has a valve body that is able to sit selectively on a first seat communicating with a drain passage or a second seat communicating with a common rail. By controlling the valve body, the control chamber communicates with either a drain port or a high pressure port. During a period in which fuel is injected, the control chamber communicates with the drain port while closing the high pressure port. In this manner, an amount of fuel flowing out to the drain passage is restricted.

It has been found out, however, that some problems are involved in the conventional pressure control valves, especially in the three-way valve. Namely, operation of the control valve becomes unstable sometimes, and/or energy loss in an actuator driving the control valve becomes high. Further, there is a possibility that durability of the control valve is adversely affected by abrasion wear due to foreign particles contained in fuel.

SUMMARY OF THE INVENTION

The present invention has been made in view of the above-mentioned problems, and an object of the present invention is to provide an improved pressure control valve for use in a fuel injector. More particularly, an object of the present invention is to improve operational stability and durability of the pressure control valve. Another object of the present invention is to provide a fuel injector in which the improved pressure control valve is used.

A fuel injector for supplying high pressure fuel to an engine cylinder includes a nozzle needle and a pressure control valve that controls a back pressure applied to the nozzle needle. The pressure control valve includes a housing having a cylinder bore and a valve chamber, and a valve needle having a valve body and a piston portion. The valve body is disposed in the valve chamber, and the piston portion is slidably disposed in the cylinder bore. The valve needle is driven by an actuator such as stacked piezoelectric elements (a piezo stack). The valve body of the valve needle selectively closes a drain port or a high pressure port of the valve chamber, thereby controlling a fuel pressure in a control chamber in which a back pressure for driving the nozzle needle is developed.

The drain port is closed by closing a drain seat with a first surface formed on the valve body, and the high pressure port is closed by closing a high pressure seat with a second surface formed on the valve body. The first surface of the valve body is made flat and the drain seat is also made flat. The second surface of the valve body is sloped so that it contacts a flat surface of the high pressure seat. Diameter D1 of the drain seat, diameter D2 of the high pressure seat and diameter D3 of the piston portion of the valve body are made to satisfy the formula: $D1 \geq D2 \geq D3$. Preferably, differences among these diameters are made small. Operation of the fuel injector can be made smooth by designing the fuel pressure control valve in this manner. Also, energy loss in the piezo stack for driving the pressure control valve can be made small.

The first surface of the valve body may be made slanted so that the diameter of the drain seat becomes stably constant. The first surface may be composed of two surfaces slanting in respective directions, forming a peak position connecting two surfaces. The peak position contacts the drain seat when the valve needle is driven to a position for closing the drain port. A slanting angle of the surface positioned outside is so made that foreign particles contained in fuel is prevented from entering the valve chamber. The slanting angle may be made, e.g., in a range from 0.5° to 10°. The high pressure seat surface may be sloped so that the outer periphery of the second surface of the valve body contacts the high pressure seat when the high pressure port is closed. In this manner, operation of the valve needle is further stabilized. A tip portion of the needle valve contacting a valve piston driven by the piezo stack may be made a spherical surface to further improve the smooth operation.

According to the present invention, the operation of the fuel injector is stabilized, energy loss in the piezo stack is reduced, and durability of the pressure control valve is improved. Other objects and features of the present invention will become more readily apparent from a better understanding of the preferred embodiments described below with reference to the following drawings.

DETAILED DESCRIPTION OF THE PREFERRED EMBODIMENTS

Figure 1A:
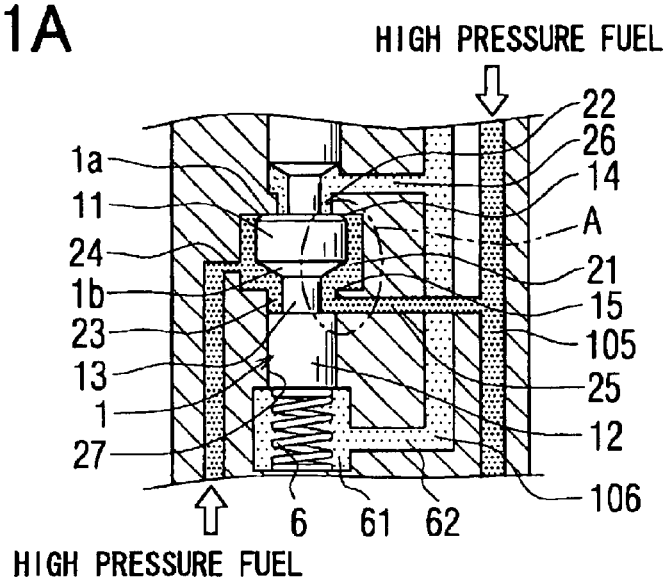
FIG. 1A is a cross-sectional view showing a pressure control valve, as a first embodiment of the present invention, used in a fuel injector.
Figure 1B:
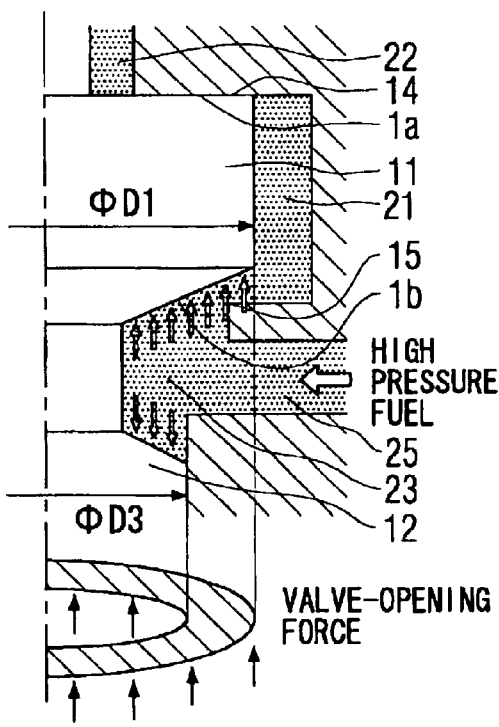
FIG. 1B is a cross-sectional view showing a portion A encircled in FIG. 1A in an enlarged scale, a valve needle sitting on a drain seat.
Figure 1C:
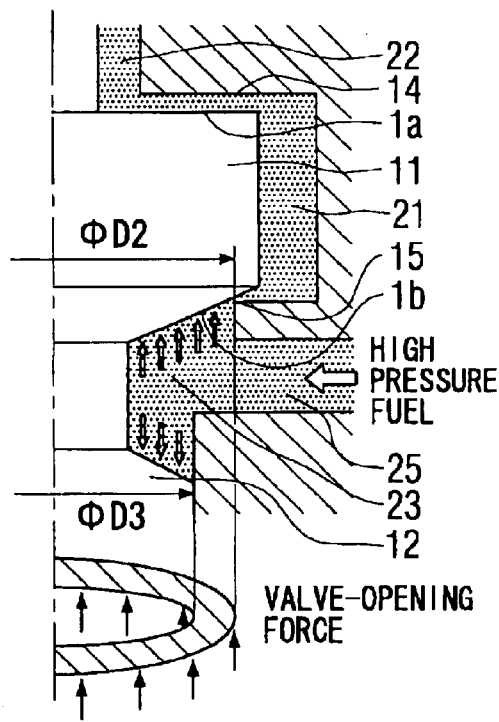
FIG. 1C is a cross-sectional view showing the portion A encircled in FIG. 1A in an enlarged scale, a valve needle sitting on a high pressure seat.
Figure 2:
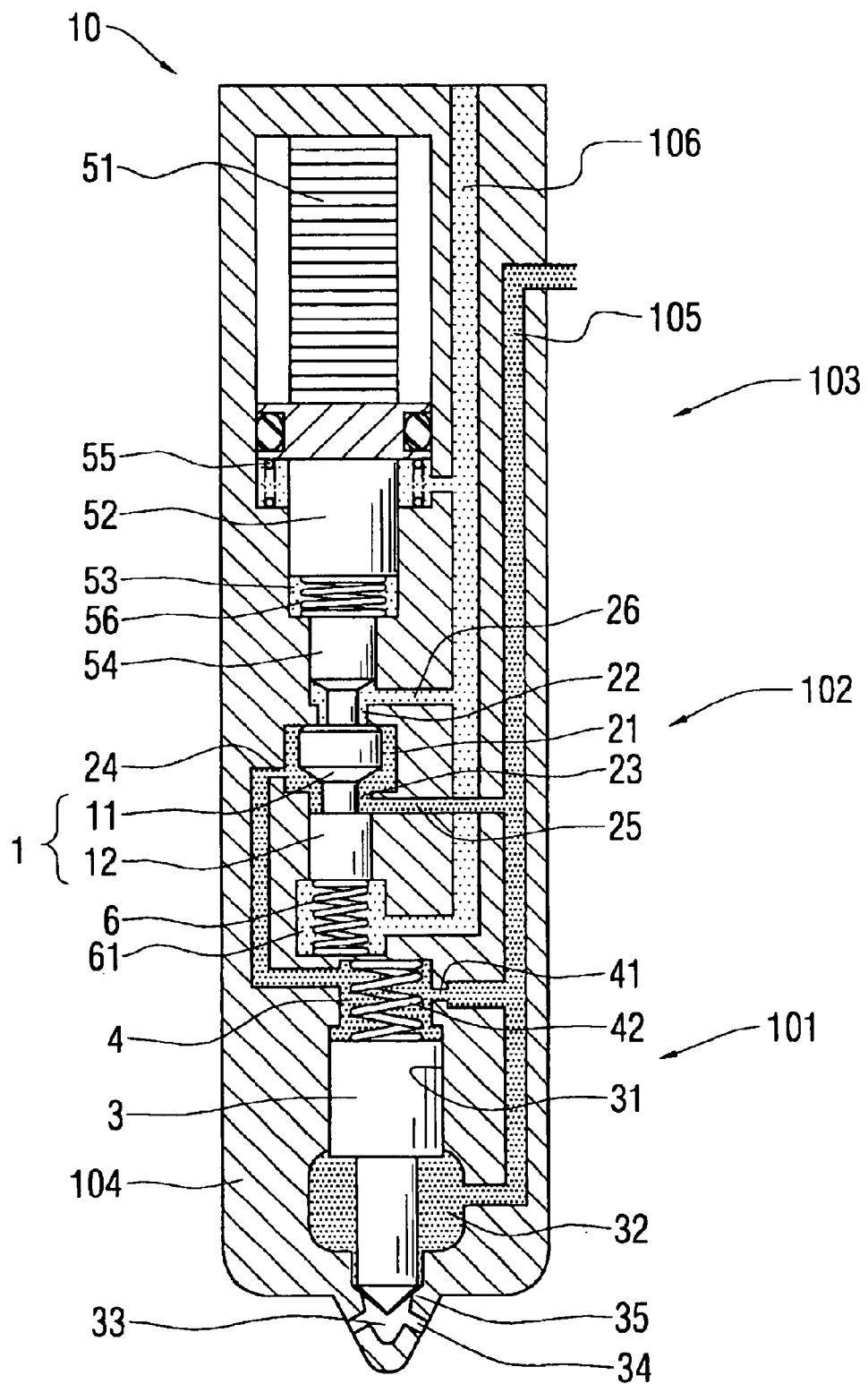
FIG. 2 is a cross-sectional view showing a fuel injector that includes the pressure control valve shown in FIG. 1A.
Figure 3:
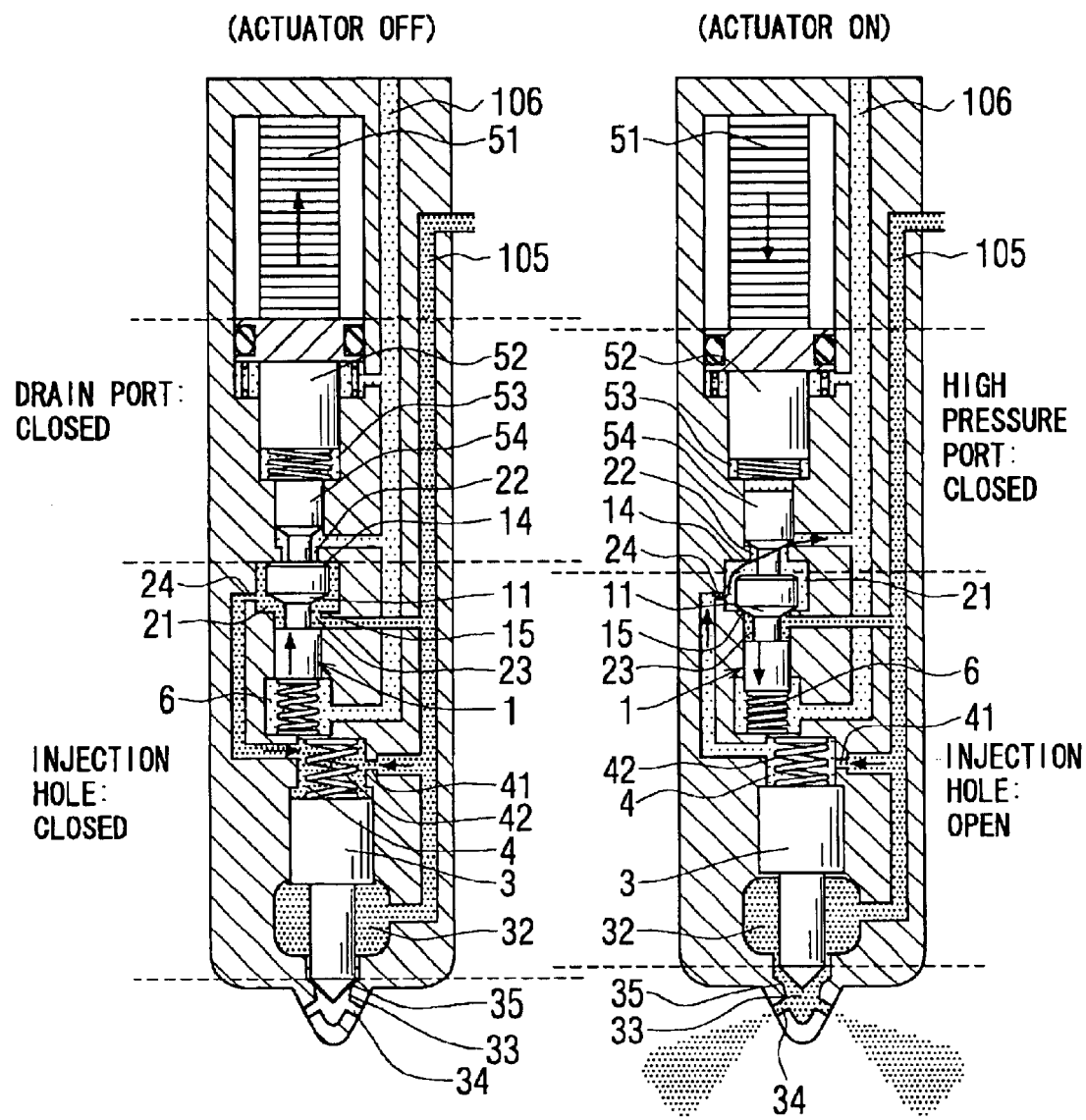
FIG. 3A is a cross-sectional view showing the fuel injector, in which a control chamber is pressurized and injection holes are closed by a nozzle needle.
FIG. 3B is a cross-sectional view showing the fuel injector, in which the control chamber is depressurized and the injection holes are opened, thereby injecting fuel.

A first embodiment of the present invention will be described with reference to FIGS. 1–4. FIG. 2 shows a fuel injector 10 in which a pressure control valve 102 according to the present invention is used. FIG. 1A shows the pressure control valve 102 in an enlarged scale, and FIGS. 1B and 1C show pressure applied to a valve body 11 disposed in a valve chamber 21. The injector 10 is installed, for example, to each cylinder of a diesel engine, and high pressure fuel stored in a common rail is supplied to each injector 10. Fuel pressurized by a supply pump to a pressure level suitable for fuel injection is stored in the common rail.

Referring to FIG. 2, the fuel injector 10 will be described. The fuel injector 10 is composed of an injector nozzle portion 101 including a nozzle needle 3, a pressure control valve 102 having a three-way valve structure and a piezoelectric driver 103 including a stack of piezoelectric elements 51. The injector nozzle portion 101, the pressure control valve 102 and the piezoelectric driver 103 are contained in a housing 104 which is installed in a wall of each combustion chamber of an engine. Fuel passages including a high pressure passage 105 connected to the common rail and a drain passage 106 connected to a fuel tank are formed in the housing 104.

The injector nozzle portion 101 includes a nozzle needle 3 slidably disposed in an axial bore 31 formed at a bottom portion of the housing 104. A fuel reservoir 32 is formed to surround a small diameter portion of the nozzle needle 3. The fuel reservoir 32 always communicates with the high pressure passage 105, and thereby a high pressure fuel is always supplied to the fuel reservoir 32 from the common rail. A tip space 33 having injection holes 34 is formed downstream of the fuel reservoir 32. A conical tip portion of the nozzle needle 3 is usually seated on a seat 35 formed at an upper end of the tip space 33, thereby interrupting fuel flow from the fuel reservoir 32 to the injection holes 34. When the nozzle needle 3 is lifted from the seat 35, fuel is supplied to the tip space 33 and the fuel is injected from the injection holes 34.

A control chamber 4 to which the fuel is supplied through the high pressure passage 105 via a sub-orifice 41 and through an orifice 24 of the valve chamber 21 is formed above the nozzle needle 3. The fuel supplied to the control chamber 4 generates a back pressure imposed on an upper flat surface of the nozzle needle 3. The nozzle needle 3 is pressed downward by the fuel pressure in the control chamber 4 and by a biasing spring 42 disposed in the control chamber 4. On the other hand, pressure in the fuel reservoir 32 is imposed on a stepped surface of the nozzle needle 3 to push it upward.

The pressure control valve 102 has a three-way valve structure. A valve needle 1 is composed of a valve body 11 and a piston portion 12 connected to the valve body 11. The valve body 11 disposed in the valve chamber 21 selectively closes a drain port 22 open to a ceiling of the valve chamber 21 or a high pressure port 23 open to the bottom of the valve chamber 21. The drain port 22 communicates with the drain passage 106 through a passage 26, and the high pressure port 23 communicates with the high pressure passage 105 through a passage 25. The valve chamber 21 always communicates with the control chamber 4 through the orifice 24. By selectively closing the drain port 22 or the high pressure port 23, pressure in the control chamber 4 is controlled.

Referring to FIGS. 1A, 1B and 1C showing the pressure control valve 102 in an enlarged scale, operation of the pressure control valve will be explained. The piston portion 12 of the valve needle 1 is slidably disposed in a cylinder bore 27, and the valve body 11 is disposed in the valve chamber 21. A connecting portion 13 connecting the valve body 11 and the piston portion 12 is positioned in the high pressure port 23, and the passage 25 communicating with the high pressure passage 105 is open to a circular space formed around the connecting portion 13.

When the valve needle 1 takes an upper position as shown in FIG. 1B, a first surface 1a (an upper flat surface) of the valve body 11 is seated on a drain seat 14 formed on the ceiling of the valve chamber 21, thereby closing the drain port 22. When the valve needle 1 takes a lower position as shown in FIG. 1C, a second surface 1b (a lower tapered surface) of the valve body 11 is seated on a high pressure seat 15 formed at the bottom portion of the valve chamber 21, thereby closing the high pressure port 23. The valve needle 1 is driven to its upper position or to its lower position by the stack 51 of the piezoelectric elements. According to the movement of the valve needle 1, the pressure in the control chamber 4 communicating with the valve chamber 21 is increased or decreased.

As shown in FIG. 2, a spring chamber 61 in which a valve spring 6 is disposed is formed underneath the piston portion 12 of the valve needle 1. The valve needle 1 is biased upward by the valve spring 6. The spring chamber 61 communicates with the drain passage 106 to avoid the spring chamber 61 from becoming a closed chamber. Since the downward movement of the valve needle 1 is not suppressed by the pressure in the spring chamber 61, the valve body 11 can quickly leave the drain seat 14 when the fuel injection starts.

The piezoelectric driver 103 includes a stack 51 of the piezoelectric elements (referred to as a piezo stack 51), a piezo piston 52 and a valve piston 54, all coaxially disposed in the housing 104 as shown in FIG. 2. The piezo piston 52 and the valve piston 54 are slidably disposed in respective axial holes formed in the housing 104. A hermetic chamber 53 (a liquid-tight chamber) is formed between the piezo piston 52 and the valve piston 54. The piezo stack 51 is a known type of a piezoelectric driver composed of alternately laminated piezoelectric element sheets (such as PZT sheets) and electrode sheets. The piezo stack 51 is biased upward with a predetermined biasing force by a spring 55 disposed around the piezo piston 52. The piezo stack 51 expands in its axial direction when voltage is applied thereto and shrinks to its original length when voltage is turned off. The piezo piston 52 moves up and down according to the expansion and the shrinkage of the piezo stack 51.

A small diameter portion of the valve piston 54 extends through the drain port 22 and abuts with the first surface 1a of the valve body 11. A spring 56 pushing the piezo piston 52 toward the piezo stack 51 is disposed in the hermetic chamber 53 that is filled with fuel. A pushing force generated by the expansion of the piezo stack 51 is transferred to the valve piston 54 via fuel in the hermetic chamber 53, and further the valve piston 54 pushes downward the valve needle 1. Since the diameter of the valve piston 54 is smaller than the diameter of the piezo piston 52, an amount of expansion of the piezo stack 51 is amplified in the axial movement of the valve piston 54. The piezo piston 52 having a larger diameter, the valve piston 54 having a smaller diameter and the hermetic chamber 53 disposed between two pistons 52, 54 function as a device for amplifying an amount of displacement.

Now, referring to FIGS. 3A and 3B, operation of the fuel injector 10 will be described. In FIG. 3A, the piezo stack 51 is not energized, i.e., not expanded. The valve needle 1 is pushed upward by the fuel pressure in the valve chamber 21 and the biasing force of the spring 6. The valve body 11 is seated on the drain seat 14, and the drain port 22 is closed while the high pressure port 23 is opened. Therefore, the control chamber 4 communicates with the high pressure passage 105 through the orifice 24, the valve chamber 21 and the high pressure port 23. Further, the control chamber 4 communicates with the high pressure passage 105 through the sub-orifice 41. Accordingly, the pressure in the control chamber 4 is high, pushing the nozzle needle 3 downward. The nozzle needle 3 is seated on the seat 35 by the back pressure in the control chamber 4 and the biasing force of the spring 42. No fuel is injected in this state.

When the piezo stack 51 is energized, it expands and pushes downward the piezo piston 52, as shown in FIG. 3B. The pressure in the hermetic chamber 53 increases according to the downward movement of the piezo piston 52. The valve piston 54 is pushed downward by the increased pressure in the hermetic chamber 53, and the valve needle 1 is pushed downward by the valve piston 54. The valve body 11 leaves the drain seat 14, thereby opening the drain port 22. As the valve body 11 further moves downward, it sits on the high pressure seat 15, thereby closing the high pressure port 23. Accordingly, the control chamber 4 communicates with the drain port 22 through the valve chamber 21, and the pressure in the control chamber 4 decreases. When the pressure in the fuel reservoir 32 pushing up the nozzle needle 3 becomes higher than the pressure pushing down the nozzle needle 3, the nozzle needle 3 is lifted from the seat 35 and fuel injection is initiated.

To stop the fuel injection, the piezo stack 51 is de-energized, thereby bringing the fuel injection to the state shown in FIG. 3A. Namely, as the piezo stack 51 shrinks, the pressure in the hermetic chamber 53 drops and the force pushing down the valve needle 1 disappears. The valve body 11 leaves the high pressure seat 15 and then becomes seated on the drain seat 14. Thus, the high pressure port 23 is opened and the drain port 22 is closed. The pressure in the control chamber 4 is quickly established by the high pressure fuel flowing through the orifice 24 and the sub-orifice 41. The nozzle needle 3 becomes seated on the seat 35, terminating the fuel injection. The sub-orifice 41 functions as a device for alleviating a pressure drop in the control chamber 4 to thereby gradually open the nozzle needle 3 when the fuel injection is initiated. Also, the sub-orifice 41 functions as a device for helping a pressure buildup in the control chamber 4 to thereby rapidly close the nozzle needle 3 when the fuel injection is terminated.

It is important that the valve needle 1 is properly shaped to attain a smooth and stable operation of the fuel injector 10. In other words, the dimensions of the valve needle 1 have to be optimized. Referring to FIGS. 1B and 1C, optimization of the dimensions of the valve needle 1 will be explained. In FIGS. 1B, and 1C, a portion "A" encircled in FIG. 1A is shown in an enlarged scale. FIG. 1B shows the valve needle 1 taking its upper position where the drain port 22 is closed, and FIG. 1C shows the valve needle 1 taking its lower position where the high pressure port 23 is closed.

When the valve needle 1 takes the upper position, as shown in FIG. 1B, the first surface 1a of the valve needle 1 is seated on the drain seat 14, closing the drain port 22, while the high pressure port 23 is open. High pressure fuel flows into the valve chamber 21 through the high pressure port 23 and the passage 25. The high pressure fuel in the valve chamber 21 imposes an upward pressure on the second surface 1b of the valve body 11 and a downward pressure on the upper surface of the piston portion 12, as shown in FIG. 1B. Therefore, a net area to which the pressure is applied to the valve needle 1 in the upward direction is expressed in the formula: $\pi(D1^2-D3^2)/4$, where D1 is a diameter of the drain seat 14 (equals to the diameter of the valve body 11), D3 is a diameter of the piston portion 12. In other words, a force opening the high pressure port 23 is applied to the area expressed in the formula.

In the first embodiment of the present invention, both diameters are set to satisfy the formula, (D1≧D3). Namely, D1 is made equal to D3 or a little larger than D3. In this manner, the force required to lift the first surface 1a of the valve body 11 from the drain seat 14 can be made small, and the operation of the valve needle 1 can be stabilized. In other words, by making the pressure applied to the valve needle 1 in the upward direction small, energy of the piezo stack 51 for driving the valve needle 1 in the downward direction can be made small. It is also important, however, to surely close the drain port 22 when the valve body 11 is seated on the drain seat 14. Therefore, the diameter D1 is made a little larger than the diameter D3 in the embodiment of the present invention. If D3 is larger than D1, the valve body 11 is not stably seated on the drain seat 14 because the downward pressure applied to the valve needle 1 overcomes the upward pressure applied thereto.

When the piezo stack 51 is not energized, the valve needle 1 takes the position as shown in FIG. 1C. At this position, the drain port 22 is open while the high pressure port 23 is closed. The second surface 1b (the tapered surface) of the valve body 11 is seated on the high pressure seat 15. Pressure of the high pressure fuel introduced from the passage 25 into the high pressure port 23 is applied to the second surface 1b of the valve body 11 in the upward direction and to the upper surface of the piston portion 12 in the downward direction as shown in FIG. 1C. A net area to which the upward pressure is applied is expressed by the formula: $\Pi(D2^2-D3^2)/4$, where D2 is a diameter of the high pressure seat 15 and D3 is the diameter of the piston portion 12.

In the first embodiment of the present invention, D2 is made equal to D3 or a little larger than D3 (D2≧D3). In this manner a force required to make the valve body 11 seated on the high pressure seat 15 and to close the high pressure port 23 can be small, the fuel injector 10 can be stably operated. The energy of piezo stack 51 required for closing the high pressure port 23 can be made small by making the net area to which the upward pressure of the fuel is applied to the valve body 11 small. If D2 is made smaller than D3, however, the valve needle 1 may not return to the upper position when the piezo stack 51 is de-energized because fuel pressure applied to the valve needle 1 in the downward direction becomes large.

Figure 4:
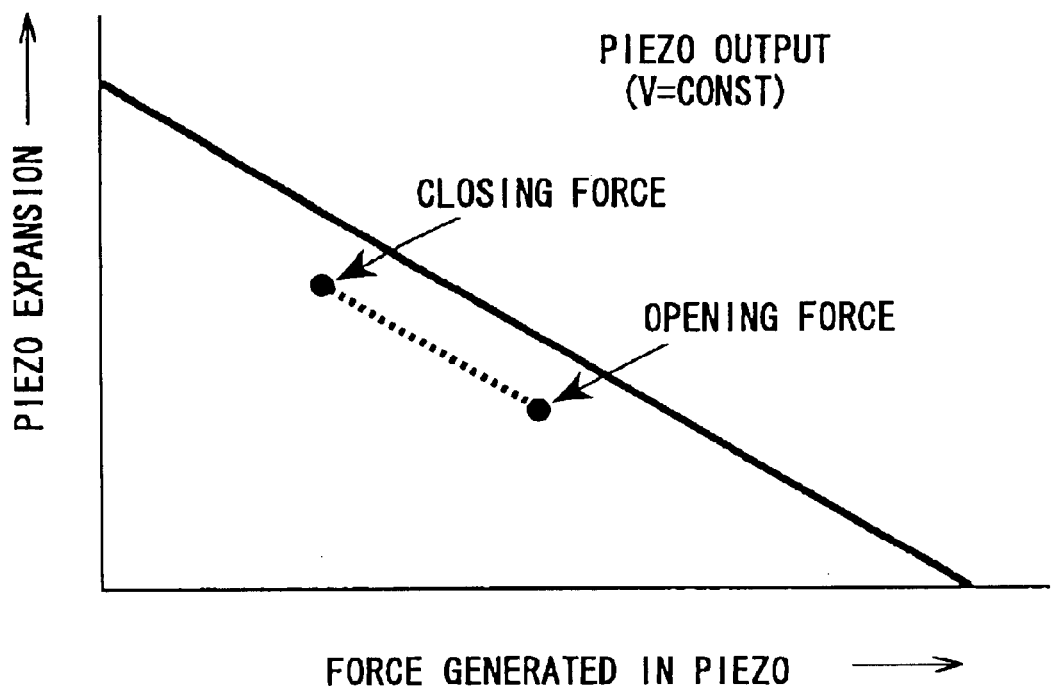
FIG. 4 is a graph showing a relation between force generated in a piezoelectric actuator and an amount of expansion thereof.

Further, a relation between the diameter D1 of the drain seat 14 and the diameter D2 of the high pressure seat 15 will be discussed. The piezo stack 51 has the characteristics shown in FIG. 4. Namely, the amount of expansion of the piezo stack 51 is inversely proportional to the force generated therein. The piezo stack 51 can be used most effectively by setting a valve closing force (a force closing the high pressure port 23 with the valve body 11) and a valve opening force (a force opening the high pressure port 23) in parallel to the characteristic line of the piezo stack 51, as shown in FIG. 4. In this manner, an energy loss in the piezo stack 51 can be minimized.

When the piezo stack 51 is energized, the valve body 11 is further driven downward to the position for closing the high pressure port 23 after it is lifted from the drain seat 14. In order to secure a necessary amount of the downward stroke of the piezo stack 51 and to set the valve closing force and the valve opening force in parallel to the characteristic line as shown in FIG. 4, the valve opening force has to be equal to or larger than the valve closing force. That is, D1 is equal to or larger than D2 (D1≧D2). It is most preferable to make D1 a little larger than D2.

According to the above analyses, the diameter D1 of the drain seat 14, the diameter D2 of the high pressure seat 15 and the diameter D3 of the piston portion 12 are set to satisfy the formula: D1≧D2≧D3. Preferably, D1 is made a little larger than D2, and D2 is made a little larger than D3. The driving force of the piezo stack 51 is so set that the valve body 11 is lifted from the drain seat 14 against the fuel pressure and the biasing force of the valve spring 6 and further driven downward to sit on the high pressure seat 15.

Figure 5A:
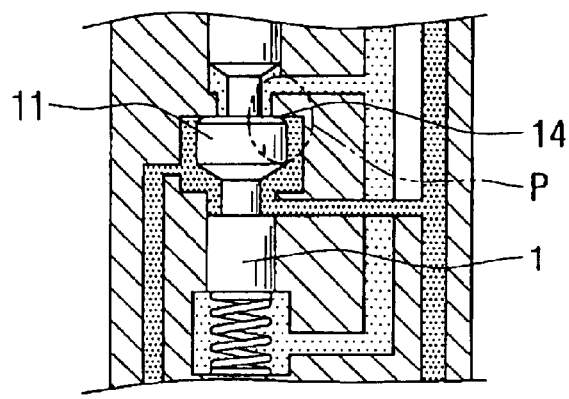
FIG. 5A is a cross-sectional view showing a pressure control valve used in a fuel injector.
Figure 5B:
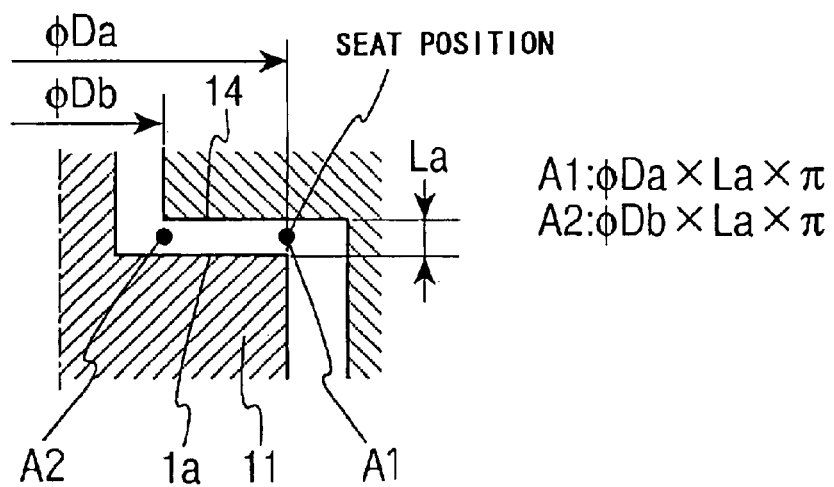
FIG. 5B is a cross-sectional view showing a portion P encircled in FIG. 5A in an enlarged scale, the structure shown here being that of the first embodiment of the present invention.
Figure 5C:
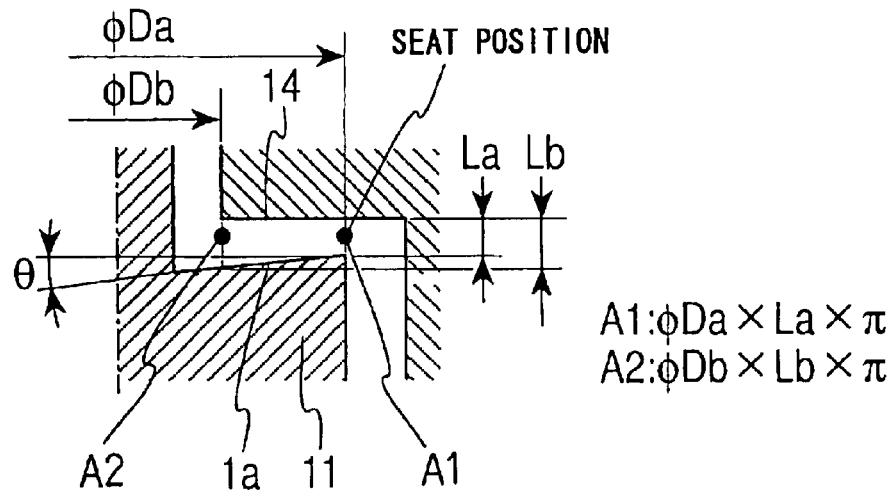
FIG. 5C is a cross-sectional view showing a portion P encircled in FIG. 5A in an enlarged scale, the structure shown here being that of a second embodiment of the present invention.

With reference to FIGS. 5A–5C, a second embodiment of the present invention will be described. The pressure control valve 102 is shown in FIG. 5A, and a portion P encircled in FIG. 5A is shown in FIGS. 5B and 5C. The structure of the first embodiment is shown in FIG. 5B and that of the second embodiment is shown in FIG. 5C. In the first embodiment, the first surface 1a of the valve body 11 is flat and parallel to the drain seat 14, as shown in FIG. 5B. In the first embodiment, a seat position may not be constant but it may vary between position A1 (corresponding to a diameter Da of the valve body 11) and position A2 (corresponding to an inner diameter Db of the drain port 22) when the first surface 1a contacts the drain seat 14. To make the seat position constant, the first surface 1a is slanted relative to the drain surface 14 in the second embodiment, as shown in FIG. 5C.

In the first embodiment shown in FIG. 5B, opening areas at the position A1 and the position A2, when the first surface 1a is lifted from the drain seat 14 by La, are expressed as follows: an opening area at A1=Da×La×π; and an opening area at A2=Db×La×π. The smallest opening is positioned at the position A2 corresponding to the diameter Db. When the first surface 1a is being lifted from the drain seat 14, the position having the smallest opening becomes an actual seat position. Accordingly, the requirement that D1 is equal to or larger than D3 (D1≧D3) is not fulfilled. Therefore, there is a possibility that the operation of the valve needle 1 becomes unstable.

In the second embodiment shown in FIG. 5C, the first surface 1a of the valve body 11 is slanted relative to the drain seat 14. Namely, the first surface 1a is sloped so that it is gradually sloped as it proceeds to the outside, making a slant angle θ relative to the drain seat 14. When the slanted first surface 1a is lifted from the drain seat 14 by La at the position A1 and by Lb at the position A2, the opening areas at the respective positions A1 and A2 are: the opening area at A1=Da×La×π; and the opening area at A2=Db×Lb×π. To place the actual seat position (where the opening area becomes smallest) at the position A1, (Du×La×π) has to be smaller than (Db×Lb×π). The slant angle θ satisfying this relation is calculated in the following manner:

$$Lb = \tan\theta \times (Da-Db)/2 + La,$$

$$(Da \times La \times \pi) < [Db \times \{\tan\theta \times (Da-Db)/2 + La\} \times \pi],$$

and accordingly, $\theta > \tan^{-1}(2 \times La/Db)$

By slanting the first surface 1a at the slant angle θ, the seat position is always at the position A1, and the fuel injector 10 can be stably operated. More particularly, when La=0.025 mm, Da=2.6 mm, and Db=2.0 mm, the stable operation of the fuel injector is realized by setting the slant angle θ at 2°.

Figure 6A:
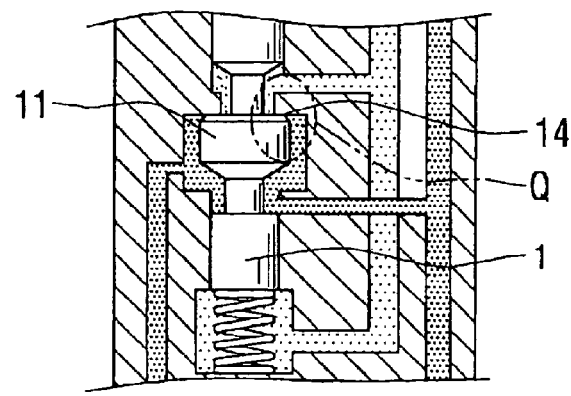
FIG. 6A is a cross-sectional view showing a pressure control valve as a third embodiment of the present invention.
Figure 6B:
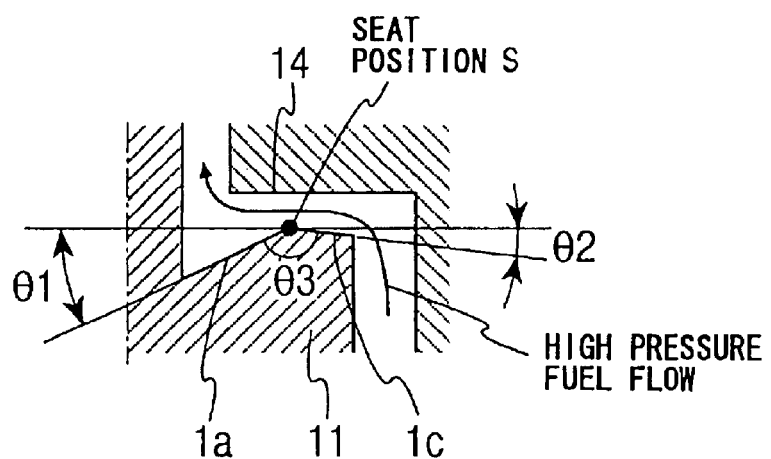
FIG. 6B is a cross-sectional view showing a portion Q encircled in FIG. 6A in an enlarged scale.
Figure 6C:
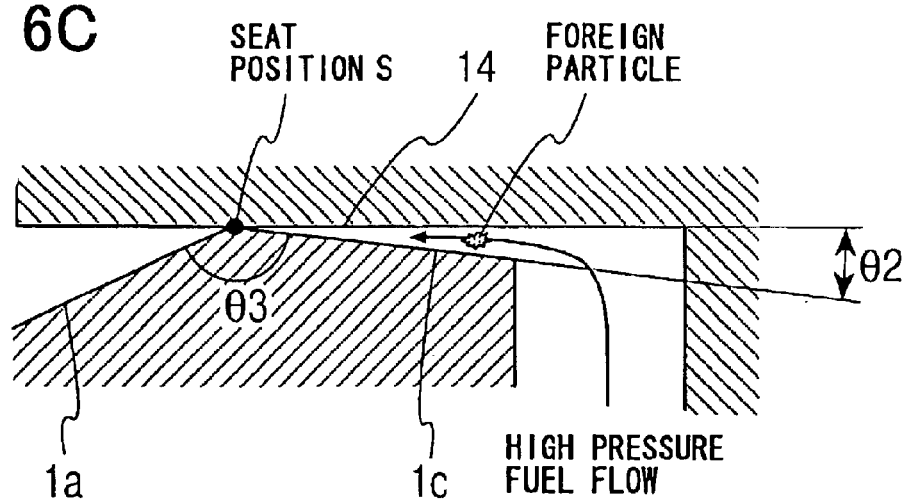
FIG. 6C is a cross-sectional view showing the portion Q encircled in FIG. 6A, in a further enlarged scale for explaining effects of preventing foreign particles from entering into the pressure control valve.

A third embodiment of the present invention will be described with reference to FIGS. 6A–7B. The pressure control valve 102 is shown in FIG. 6A, and a portion "Q"

encircled in FIG. 6A is shown in FIGS. 6B and 6C. The basic structure and operation of the third embodiment is the same as those of the first embodiment, but the first surface 1a of the valve body 11 is modified to the form shown in FIG. 6B. The first surface 1a is slanted by θ1 relative to the drain seat 14, and an additional slanted surface 1c is formed next to the first surface 1a. The additional slanted surface 1c is slanted by θ2 relative to the drain seat 14. The first surface 1a and the additional slanted surface 1c make an angle θ3 therebetween, and a point S connecting both surfaces contacts the drain seat 14 when the valve body 11 sits on the drain seat 14. Namely, the point S is the seat position in this embodiment.

The slant angle θ2 relative to the drain seat 14 is set so that foreign particles entering into the valve chamber 21 together with the high pressure fuel (as shown in FIG. 6C) are caught, and abrasion due to the foreign particles are prevented. When the drain port 22 is opened as shown in FIG. 6B, an amount of fuel flowing through the passage between the valve body 11 and the drain seat 14 is small, and a pressure difference between the upstream side and the downstream side is small. In addition, a period of time in which the drain port 22 is open is not long, i.e., about several percents of one cycle. Therefore, abrasion by the foreign particles does not proceed much. The abrasion proceeds during a period of time in which the drain port 22 is closed as shown in FIG. 6C.

Figure 7A:
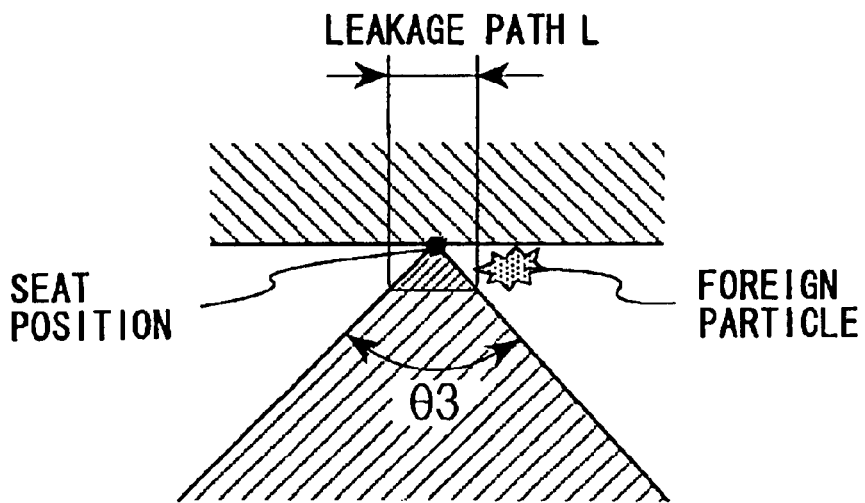
FIGS. 7A and 7B are cross-sectional views showing the same portion as shown in FIG. 6C and explaining a structure for preventing the foreign particles from entering into the pressure control valve.
Figure 7B:
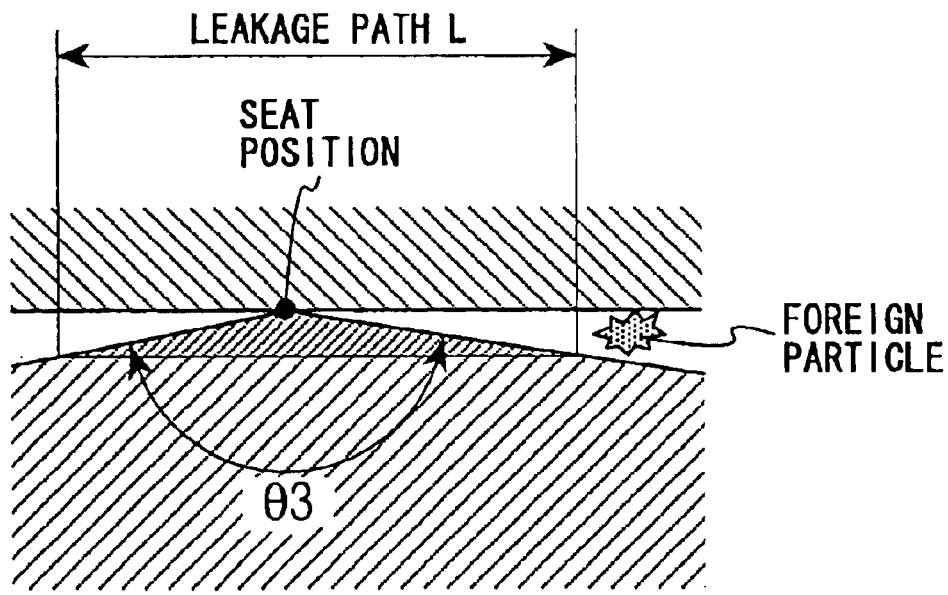

If the angle θ3 is an acute angle as shown in FIG. 7A, the surface of the valve body 11 is easily damaged by abrasion due to the foreign particles entering into the valve chamber 21. Since the leakage path L is short when the angle θ3 is acute, a width of the leakage path is easily widened by the foreign particles. On the other hand, if the angle θ3 is an obtuse angle as shown in FIG. 7B, the abrasion by the foreign particles is much alleviated. Since the leakage path L is long in this case, the leakage passage is not easily widened by the foreign particles. It is difficult, however, to place the seat position at an accurate position if the angle θ3 is too large. Therefore, it is proper to set the angle θ3, for example, around 150°.

By making the slant angle θ2 small, it is possible to catch the foreign particles at the upstream of the passage, as shown in FIG. 7B. For this purpose, the slant angle θ2 is set in a range from 0.5° to 10° (0.5°≦θ2≦10°), and (θ1+θ2) is set around 30°. More particularly, θ2 is set to 2° and θ1 to 25°, for example.

Figure 8A:
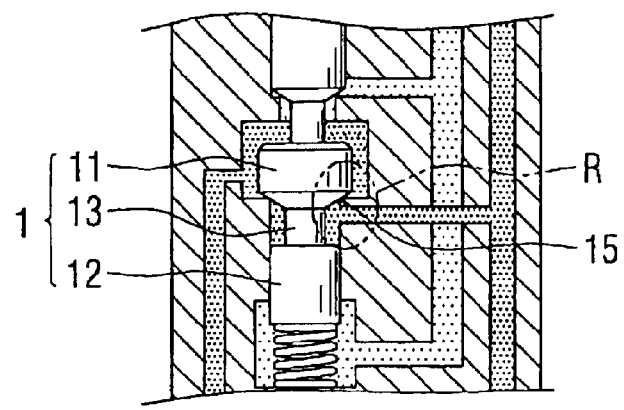
FIG. 8A is a cross-sectional view showing a pressure control valve as a fourth embodiment of the present invention.
Figure 8B:
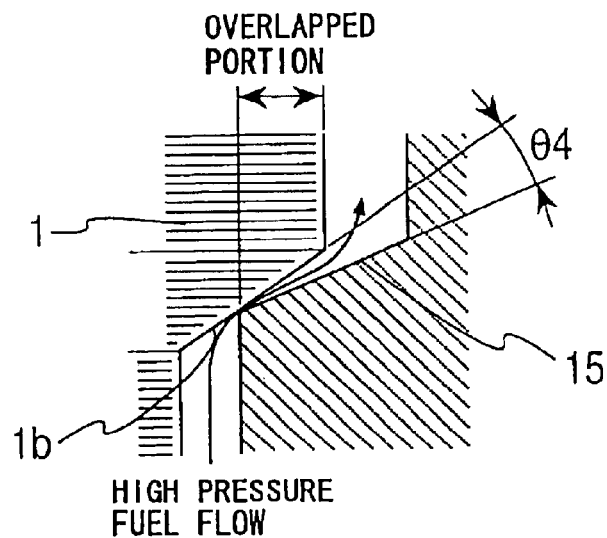
FIG. 8B is a cross-sectional view showing a portion R encircled in FIG. 8A in an enlarged scale.
Figure 8C:
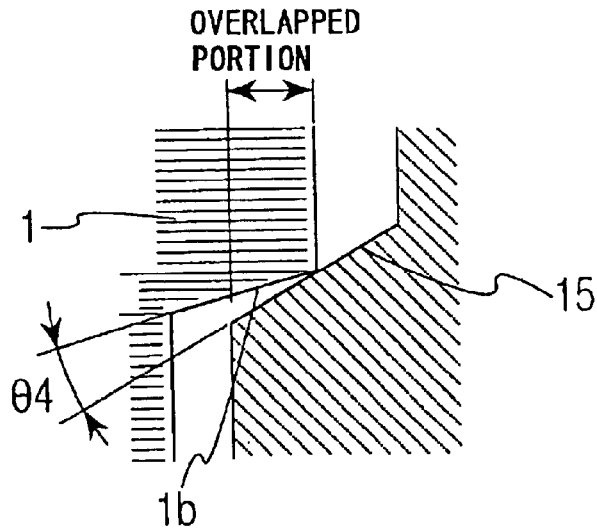
FIG. 8C is a cross-sectional view showing the same portion as shown in FIG. 8B, the structure shown here being a form modified from that of the FIG. 8C.

Referring to FIGS. 8A–8C, a fourth embodiment of the present invention will be described. FIG. 8A shows the pressure control valve 102, and FIGS. 8B and 8C show a portion "R" encircled in FIG. 8A. In this embodiment, the basic structure and operation are the same as those of the first embodiment, but the shape of the high pressure seat 15 is modified. As shown in FIG. 8B, the plane of the high pressure seat 15 is slanted at an angle θ4 relative to the second surface 1b of the valve body 11.

It is advantageous to make the angle θ4 as small as possible to prevent the foreign particles as mentioned above. However, it becomes difficult to accurately set the seat position (the diameter of the high pressure seat 15) at a desired position if the angle θ4 is too small. Accordingly, the angle θ4 is set to 1°, for example. When an overlapped portion where the second surface 1b of the valve body 11 overlaps with the slanted surface of the high pressure seat 15 is formed downstream of the seat position as shown in FIG. 8B, a pressure drop after the seat position becomes large, and the pressure decreases in the overlapped portion. As a result, a downward force is applied to the valve needle 1, and there is a possibility that the valve needle movement becomes unstable.

To cope with the problem mentioned above, the overlapped portion is formed upstream of the seat position as shown in FIG. 8C. The pressure drop in the overlapped portion becomes small and the downward force applied to the valve needle 1 becomes small. It is desirable to make the length of the overlapped portion as short as possible to reduce the pressure drop. However, it is impossible to completely eliminate a deformation of the edge in a machining operation of the valve needle 1. Considering such deformation in an amount of about 0.03 mm, the length of the overlapped portion is made about 0.1 mm. In this manner, the operation of the injector 10 is further stabilized.

Figure 9A:
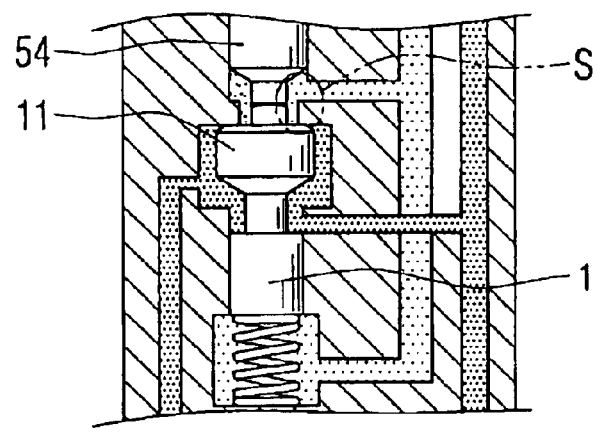
FIG. 9A is a cross-sectional view showing a pressure control valve as a fifth embodiment of the present invention.
Figure 9B:
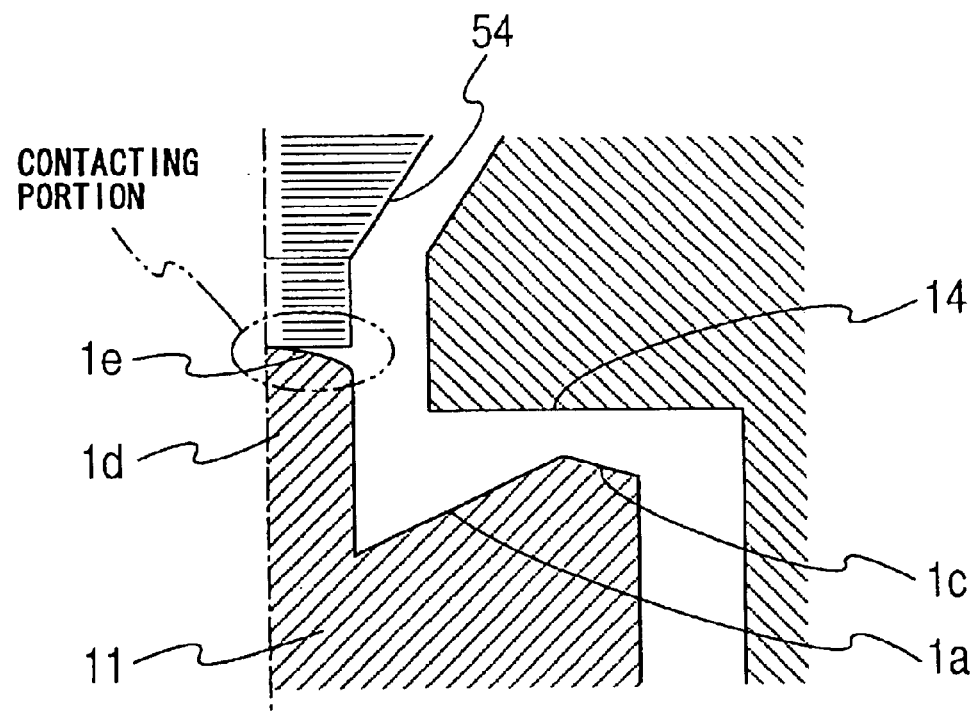
FIG. 9B is a cross-sectional view showing a portion S encircled in FIG. 9A in an enlarged scale.

A fifth embodiment of the present invention will be described with reference to FIGS. 9A and 9B. In FIG. 9A, the pressure control valve 102 is shown, and a portion "S" encircled in FIG. 9A is shown in an enlarged scale in FIG. 9B. The fifth embodiment is similar to the third embodiment shown in FIG. 6B and described above, but a projected portion 1d is formed on the upper surface of the valve body 11. The tip of the projected portion 1d contacting the valve piston 54 is formed into a spherical surface 1e. Since the valve needle 1 contacts the valve piston 54 at the spherical surface 1e, the pushing force of the valve piston 54 is effectively transferred to the valve needle 1 at a minimal transmission loss if the valve needle 1 is slightly slanted with respect to its sliding surface, thereby reducing an abrasion wear of the sliding surface.

As described above, the pressure control valve 102 for controlling the back pressure applied to the nozzle needle 3 of the fuel injector 10 stably and efficiently operates by improving and optimizing the shape and dimensions of the components thereof. While the present invention has been shown and described with reference to the foregoing preferred embodiment, it will be apparent to those skilled in the art that changes in form and detail may be made therein without departing from the scope of the invention as defined in the appended claims.

What is claimed is:

1. A pressure control valve, driven by an actuator, for controlling pressure in a control chamber, the pressure control valve comprising:
   a housing having a cylinder bore and a valve chamber that includes a high pressure port having a high pressure seat and a drain port having a drain seat; and
   a valve needle having a valve body disposed in the valve chamber and a piston portion connected to the valve body and slidably disposed in the cylinder bore, the valve body having a first surface adapted to contact the drain seat and a second surface adapted to contact the high pressure seat, wherein:
      the pressure in the control chamber is controlled by selectively closing the high pressure port or the drain port, the high pressure port being closed by sitting the second surface of the valve body on the high pressure seat, the drain port being closed by sitting the first surface of the valve body on the drain seat; and
      the pressure control valve is structured to satisfy the following formula: D1>D2>D3, where D1 is a diameter of the drain seat, D2 is a diameter of the high pressure seat and D3 is a diameter of the piston portion.

2. The pressure control valve as in claim 1, wherein:
   the diameter of the high pressure seat is a little larger than the diameter of the piston portion, and the diameter of the drain seat is a little larger than the diameter of the high pressure seat.

3. The pressure control valve as in claim 1, wherein:
the actuator for driving the pressure control valve is composed of a stack of piezoelectric elements.

4. The pressure control valve as in claim 1, wherein:
the drain seat is a flat surface perpendicular to an axial direction of the pressure control valve; and
the first surface of the valve body is a surface slanted relative to the drain seat, ascending from its inner fringe toward its outer fringe, the first surface contacting the drain seat at the outer fringe thereof when the valve body closes the drain port.

5. The pressure control valve as in claim 1, wherein:
the drain seat is a flat surface perpendicular to an axial direction of the pressure control valve;
the first surface of the valve body is composed of a surface slanted relative to the drain seat, ascending from its inner fringe toward a seat position, and an additional surface slanted relative to the drain seat, descending from the seat position toward an outer fringe of the first surface; and
the first surface contacts the drain seat at the seat position when the valve body closes the drain port.

6. The pressure control valve as in claim 5, wherein:
an angle made between the drain seat and the additional slanted surface is such a size that is able to catch foreign particles contained in liquid flowing into the valve chamber.

7. The pressure control valve as in claim 5, wherein:
an angle made between the drain seat and the additional slanted surface is in a range from 0.5° to 10°.

8. The pressure control valve as in claim 5, wherein:
an angle made between the slanted surface and the additional slanted surface is an obtuse angle.

9. The pressure control valve as in claim 1, wherein:
the first surface of the valve body is a flat surface perpendicular to an axial direction of the pressure control valve; and
the second surface of the valve body is a surface slanted relative to a plane perpendicular to the axial direction of the pressure control valve, ascending from its inner fringe toward its outer fringe, the high pressure seat contacting the second surface at a position between the inner fringe and the outer fringe of the second surface when the valve body closes the high pressure port.

10. The pressure control valve as in claim 1, wherein:
the first surface of the valve body is a flat surface perpendicular to an axial direction of the pressure control valve;
the second surface of the valve body is a surface slanted relative to a plane perpendicular to the axial direction of the pressure control valve, ascending from its inner fringe toward its outer fringe; and
the high pressure seat is a surface further slanted relative to the slanted second surface of the valve body, the second surface contacting the high pressure seat at the outer fringe of the second surface when the valve body closes the high pressure port.

11. The pressure control valve as in claim 10, wherein:
the slanted second surface of the valve body and the slanted surface of the high pressure seat overlaps with each other in a radial direction perpendicular to the axial direction of the pressure control valve, the overlapped length being set to 0.1 mm or less.

12. A fuel injector having a control chamber for controlling operation of a nozzle needle, a pressure of the control chamber being controlled by the pressure control valve defined in claim 1.

* * * * *